UNITED STATES PATENT OFFICE.

FRANK P. HEBERT, OF SAN FRANCISCO, CALIFORNIA, ASSIGNOR OF ONE-HALF TO GEORGE J. HENRY, OF SAN FRANCISCO, CALIFORNIA.

PROCESS OF CURING OLIVES AND PRODUCT THEREOF.

1,211,844.  Specification of Letters Patent.  Patented Jan. 9, 1917.

No Drawing.  Application filed September 5, 1916.  Serial No. 118,425.

*To all whom it may concern:*

Be it known that I, FRANK P. HEBERT, a citizen of the United States, residing at San Francisco, county of San Francisco, State of California, have invented new and useful Improvements in the Process of Curing Olives and Product Thereof, of which the following is a specification.

This invention relates to the process of curing olives so as to preserve them from spoiling, to neutralize the bitterness, and to retain therein the oil and natural elements and in edible form. It is applicable both to green and black olives and is especially applicable to ripe olives. This has heretofore been accomplished in a less efficient way by treating the olives with a solution of lye or other caustic or other potash salt and which has had the effect of destroying much of the oil and other natural qualities and leaving the surfaces of a dull and dry appearance, even after aeration, and the solid matter in a woody and pulpy condition; and this is true whether thereafter treated with other chemicals or not. The effect of such treatment is the destroying of much of the food and medicinal value of the olive as well as giving a product of dry, colorless and inferior appearance.

Processes heretofore may be described generally as consisting of chemical treatment and followed sometimes by a preservative treatment upon the already depleted fruit. By my process I avoid all chemical action of lye or other caustic salts upon the fruit and retain the said fruit with its natural qualities and therefore food and medicinal value to a much greater degree than heretofore. By my process any bitterness or other unpalatable qualities of the olive are neutralized or rendered substantially inert, while the olive retains all of its desirable qualities. The olives so treated retain a much higher percentage of the natural oil and other food and medicinal values, the fruit body is of superior flavor and consistency and of a glossy or oily appearance, and the pits retain their natural qualities to a higher degree than where other chemicals are employed as heretofore and where the preservation of the olive is dependent on extraction of part or all of certain valuable elements.

The preferred form of my process and applicable particularly to the preparation of the California ripe olives for marketing is described as follows: I first place the fruit in crates, or baskets, or vats, or other suitable receptacle, and preferably provided with means of ventilation and drainage, in combination with coarse or granular or rock salt. This is continued until the olive takes up the requisite salt after which the superfluous salt is removed. This may be done by removing the olives to a table, or screen bottomed tray, or other suitable holder, and the salt removed by gentle agitation, or blowing, or suction, or a simple brushing or wiping of the surface or any other suitable means may be employed. The olives are now placed in closed containers, which may be suitable for shipping, with the proper quantity of fresh salt, preferably a finer grade; and shortly thereafter a small amount of brine or water is added. During this period and before shipment they are turned or moved from time to time to secure the exposure of the entire mass to the saturated solution of salt and are now ready for marketing.

I claim:

1. The method of curing olives consisting of distributing salt with the olives, next removing such salt as has not been taken up by the olives, then treating them with further salt and water.

2. The process of curing olives by the action of salt, by distributing olives and salt in a ventilated receptacle, then mechanically removing the unassimilated salt from the surfaces of the olives, then subjecting the olives to the further action of salt and water.

3. The process of curing olives by the action of salt, by distributing olives and salt in layers for a period of time in a ventilated receptacle, then mechanically removing the unassimilated salt from the surfaces of the olives, then subjecting the olives to the further action of salt and water.

4. The process of curing and preserving olives by subjecting them to the action of granular, coarse or rock salt in a ventilated receptacle for a period of time, then separating surface adhering salt from the olives, then placing them in a liquid container with substantially dry salt and thereafter adding a quantity of water less than sufficient to dissolve said salt.

5. The process of curing or preserving olives by subjecting them to the action of granular salt in alternating layers contained within a receptacle having openings in the sides and bottom, after which surface adhering salt is removed, and then treating them within a closed receptacle to the further action of salt, and during said treatment adding a small quantity of water.

6. As an article of manufacture, olives submitted, first, to substantially dry salt, second, the removal of surface adhering salt, and third, further salt and a small quantity of water, resulting in an oily surfaced, soft and partly shriveled but firm fruit.

7. As an article of manufacture, olives submitted, first, to substantially dry salt distributed with the air dry olives in ventilated receptacles, then removing the unassimilated salt from the surfaces of the olives, and then packing them with other salt and a small quantity of water, resulting in an oily surfaced, soft and partly shriveled but firm fruit.

FRANK P. HEBERT.

Copies of this patent may be obtained for five cents each, by addressing the "Commissioner of Patents, Washington, D. C."